A. C. GILBERT.
ELECTRIC FAN.
APPLICATION FILED MAR. 15, 1918.

1,383,616.

Patented July 5, 1921.

Inventor
Alfred C. Gilbert
By
Henry E. Rockwell
Attorney

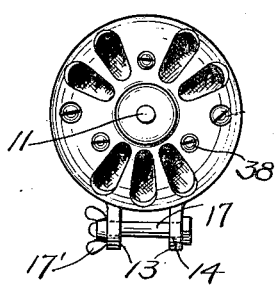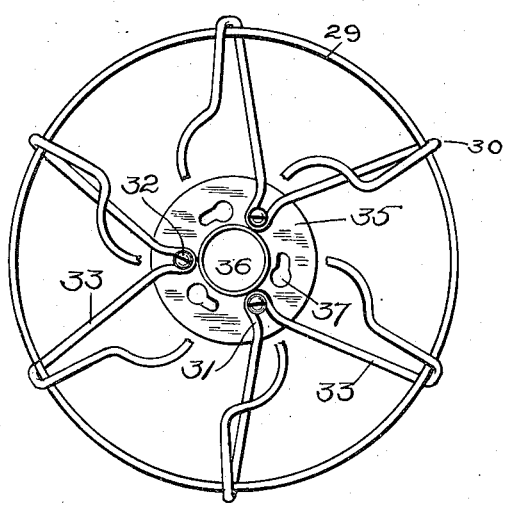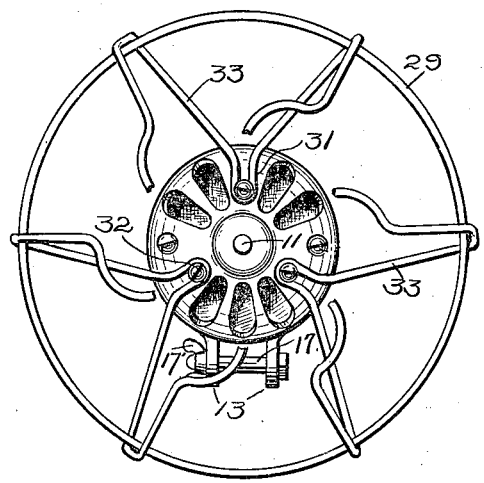

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC FAN.

1,383,616. Specification of Letters Patent. Patented July 5, 1921.

Application filed March 15, 1918. Serial No. 222,597.

*To all whom it may concern:*

Be it known that I, ALFRED C. GILBERT, a citizen of the United States, residing in the city and county of New Haven, State of Connecticut, have invented certain new and useful Improvements in Electric Fans, of which the following is a full, clear, and exact description.

This invention relates to electric fans and more especially to the fan guard which surrounds the fan blades of the same.

One object of the invention is to provide the fan with a fan guard of novel and simple construction.

Another object of the invention is to provide the fan with a fan guard having novel means for mounting the guard upon the motor.

Still another object of the invention is to provide the fan with a fan guard which may easily be placed upon or removed from the fan motor in order to allow the motor to be used for other purposes.

To these and other ends, the invention consists in the novel features and combinations of parts to be hereinafter described and claimed.

Fig. 3 is an end view of the electric motor with the fan, fan guard and supporting base removed.

Fig. 4 is a front view of the fan guard removed from the motor, a portion of the guard being shown broken away, in order to more clearly disclose the means by which the guard is attached to the motor; and Fig. 5 is a front view of the fan guard, showing simplified means for securing the guard to the motor casing.

Figure 1:
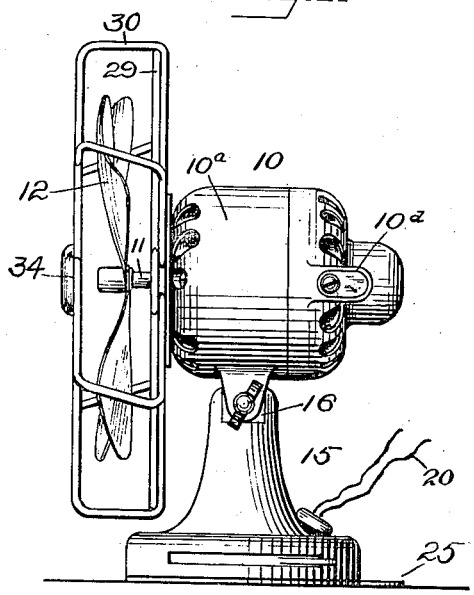
Figure 1 is a side view of an electric fan with the improved guard applied thereto.

In the drawings I have designated the electric motor for the fan herein disclosed by the numeral 10. The parts of the motor are preferably housed in a casing 10$^a$. As no claim is made herein to the specific motor construction, it is not necessary to describe the same in detail. It will suffice to say that the motor is provided with the armature spindle 11, rotating in bearings in the casing 10$^a$, one end of which projects beyond the casing and has rigidly secured thereto the fan 12. The casing 10$^a$ is also provided with the extensions 10$^d$ in which the brushes (not shown) are mounted.

The motor casing is pivotally supported on the base 15 by a pivot pin 17 passing through the upper end 16 of the base and openings 14 in spaced lugs 13 on the lower part of the casing. The motor mounting is thus, as shown, adapted for either table or wall use. The pivot bolt 17 is provided with a wing nut 17' to enable the motor to be clamped in any position on the base when this nut is turned up tightly.

The usual switch 18 is provided to control the motor and the current is supplied through the wires 20. On the lower end of the base is a supporting plate 25 on which the device rests when placed upon a table or shelf or by which it may be secured upon a wall or vertical surface.

In order to protect the blades of the fan 12 and to prevent objects from coming in contact with them when the fan is rapidly rotated, I provide a fan guard, designated in its entirety by the numeral 28. This guard is preferably constructed by providing a wire hoop such as 29, to which is secured by brazing or other desired means a plurality of curved wires 30, that are bent to form a cage in which the fan is inclosed. These wires 30 are preferably provided between the fan blades and the motor with loops such as 31, adapted to receive securing screws or rivets 32. The looped portions of the wires extend outwardly in a parallel relation for a short distance, and then flare outwardly as at 33 toward the hoop 29, to which they are secured in the manner above mentioned. The several wires 30 have their ends bent so that they converge toward a central point in front of the spindle 11, upon which the fan is mounted, where the several ends are connected together and are preferably covered by a cap plate such as 34, which cap plate gives the fan guard a more pleasing appearance and serves as means upon which the name of the maker of the fan or other advertising matter may be placed. The guard 28 is preferably provided with a disk-like member 35 having an opening therein 36, through which the armature spindle 11 projects. This disk 35 is also provided with a plurality of openings which are known as key-hole slots 37, which coöperate with screws 38 mounted upon one end of the motor casing (see Fig. 3). The disk 35 is secured to the wire guard 28 by the screws 32, above mentioned. These screws or rivets are provided with heads which clamp the looped portions 31 of the guard firmly against one face of the disk 35. By means of the key-hole slots 37 formed in the disk 35, the fan guard may be quickly and easily applied to or removed from the motor 10 by simply placing the disk 35 over the screw heads 38, and then rotating the disk slightly, so that the reduced portion of the slots 37 is positioned under the heads of the screws 38.

In Fig. 5, I have disclosed means by which the guard 28 may be secured directly to the motor 10 without necessitating the use of the disk 35. In this figure, the disk 35 has been omitted and the guard 28 is secured directly to the motor 10 by inserting the screws 38 through the loops 31 and then tightening up the screws until the heads of the same clamp the loops 31 against the end of the motor casing.

From the above description, when taken in connection with the drawings, it will be apparent that the device herein described provides a convenient means for adjustably supporting an electric motor upon its base either upon a horizontal or vertical surface and also provides a fan guard which is simple in construction and one which may be easily attached to or removed from the motor.

Figure 2:
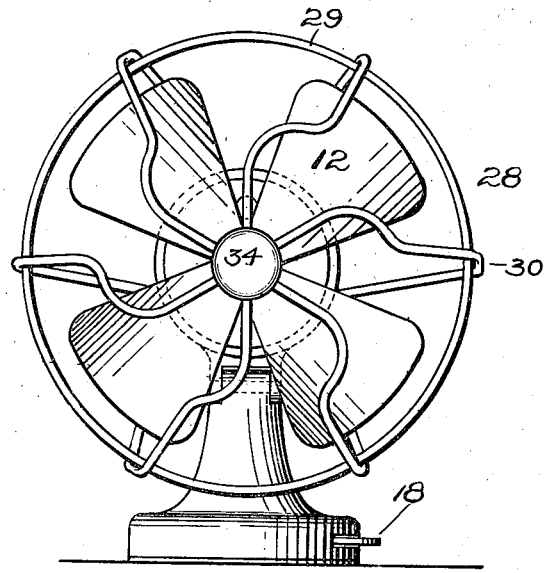
Fig. 2 is a front view of the same.

In Fig. 1 of the drawing, the guard 28 is illustrated as turned about its axis through a small angle relatively to the motor 10, that is, the guard, as illustrated in Fig. 1, is not shown in quite the position in which it would appear in a side view of the device shown in Fig. 2. The guard is shown as rotated through a small angle relatively to the motor in this figure to avoid showing one of the wires 30 as lying across the spindle 11, as would actually appear in a side view of Fig. 2.

What I claim is:

1. A fan motor having a motor-containing casing, a fan operatively secured to said motor, a guard for said fan, and means for securing said fan guard to said motor casing, comprising headed securing members mounted upon one end of said casing and means upon said guard having spaced outwardly flaring portions straddling the body portion of said members.

2. A fan guard composed of a plurality of sections, each formed of a strip of wire having an intermediate looped portion lying in the plane of the rear face of said guard, and having legs radiating outwardly from said loop, each of said legs having a portion bent forwardly to lie in the periphery of said guard with the end portion thereof bent inwardly in substantially a radial direction to lie in the plane of the front face of said guard, whereby each wire forms a substantial portion of the front and rear walls of said guard.

3. A fan guard having its rear wall composed of a plurality of wire sections, each section having a U-shaped construction with legs diverging outwardly therefrom to form a substantial portion of said rear wall, said U-shaped portion of each section adjacent the loop of the same having its legs positioned to form a narrow slot therebetween to receive the shank of a screw or the like for securing said fan guard to a support.

4. A fan guard and means for securing the same to a support, comprising a fan guard having its rear wall composed of a plurality of wire sections, each section having a U-shaped construction with legs diverging outwardly therefrom to form a substantial portion of said rear wall, and headed members positioned within the loops of said U-shaped sections with the heads overlying each looped portion to clamp the same against a supporting surface.

5. A fan guard composed of a plurality of sections each formed of a strip of wire having an intermediate looped portion lying in the plane of one end wall of said guard and forming a substantial part of said wall, said looped portion constituting the securing means of the guard, a second portion of each strip of wire connected to said looped portion and lying in the plane of the other end wall and forming a substantial part thereof and a hoop secured to said sections for retaining the same in place.

6. A fan guard and means for securing the same to a support, comprising headed members mounted in a support, and a fan guard having a wall thereof composed of a plurality of wire sections, the wires of a portion of each section being substantially parallel to straddle the body portion of one of said members and to flare outwardly therefrom toward the periphery of said guard.

7. A fan guard and means for securing the same to a support, comprising a plurality of headed members mounted in a support, and a wire guard having loops formed in a plurality of the wires of the guard, the wires of said loops being substantially parallel to straddle said members and to be clamped thereby to the support.

8. A fan guard and means for securing the same to a support, comprising a plurality of headed members mounted in a support, and a wire guard having loops formed in a plurality of the wires of the guard, the wires of said loops being substantially parallel at a portion thereof to straddle said members and to be clamped thereby to the support, said loops provided with outwardly radiating legs forming a wall of said guard.

9. A fan motor having a motor containing casing, a fan operatively secured to said motor, a guard for said fan, and means for securing said fan guard to said motor casing comprising securing members mounted upon one end of said casing, means upon said guard having spaced outwardly flaring portions straddling the body portion of said members and an enlargement upon the outer end of said members to clamp said guard to said support.

In witness whereof I have hereunto set my hand on the 12th day of March, 1918.

ALFRED C. GILBERT.